Aug. 4, 1953 J. L. WAGNER ET AL 2,647,360
ELECTRIC TIME SYSTEM WITH ELECTRONIC SELF-REGULATION
Filed June 28, 1949 5 Sheets-Sheet 2

INVENTORS
JOHN L. WAGNER
WASHINGTON WEBB
ROBERT N. EICHORN
BY John F. Hanifin
ATTORNEY INVENTORS
JOHN L. WAGNER
WASHINGTON WEBB
ROBERT N. EICHORN
BY John F. Hanifin
ATTORNEY Patented Aug. 4, 1953

2,647,360

UNITED STATES PATENT OFFICE 2,647,360

ELECTRIC TIME SYSTEM WITH ELECTRONIC SELF-REGULATION

John L. Wagner, Endwell, Washington Webb, Endicott, and Robert N. Eichorn, Vestal, N. Y., assignors to International Business Machines Corporation, New York, N. Y., a corporation of New York Application June 28, 1949, Serial No. 101,884

2 Claims. (Cl. 58—35)

This invention relates to a system for actuating secondary clocks by a master clock to maintain all of the clocks in the system in synchronism with the master clock.

The present invention is directed to synchronization of secondary clocks or the operation of signal units under the control of a master clock by the agency of electrical energy, and has for its object to utilize for that energy a high frequency signal.

Another object is to produce an electronically operated clock synchronizing system involving the use of as few wires as possible.

This particular clock system comprises means for impressing accurately controlled time signals of a high frequency upon a commercial electric light and power system, which power system serves as the transmission medium, and having means connected to the power system for receiving said signals, that means utilized to synchronize any number of remotely situated secondary clocks or energize any number of signal units, such as bells, buzzers, horns, etc.

The operation of the system is accomplished by a master clock which periodically energizes an electronic transmitter and causes it to transmit a signal. In the preferred program, the signal is transmitted once each hour for a duration of four seconds beginning two seconds before and ending two seconds after the fifty-eighth minute. The transmitter is connected to the local alternating current lighting system and its transmitted signal is available throughout the system for any selective tuned receiving unit which is connected thereto. Each secondary clock is equipped with a receiver, within which the signal is utilized to pick up a clutch magnet. Two seconds after pick-up of the clutch magnet the self-regulating cycle of the clock starts. The purpose of this two-second delay is to prevent the clock from starting the self-regulating cycle in case transients of the operating frequency should be experienced in the system. If the secondary clocks are in agreement with the master clock, they will be unaffected by the signal; however, if they are approximately fifty-nine minutes slow to fifty-five seconds fast at the fifty-eighth minute, they will be correct at the fifty-ninth minute. In the absence of the signal, the secondary clocks will operate as normal clocks.

Should the secondary clocks be more than fifty-nine minutes slow, provision is made for transmitting a signal once each minute which will move the clocks ahead one hour on the reception of each signal.

The master clock can also cause the operation of audible signals in a similar manner. The frequency of the signal used in this application will usually be different than the synchronizing signal since it probably would not be desirable to operate audible signals at the time selected for synchronizing clocks. The receiver circuits are essentially the same, except that the audible signal unit itself rather than a clutch magnet is energized.

Other objects of the invention will be pointed out in the following description and claims and illustrated in the accompanying drawings, which disclose, by way of example, the principle of the invention and the best mode, which has been contemplated, of applying that principle.

Figure 1:
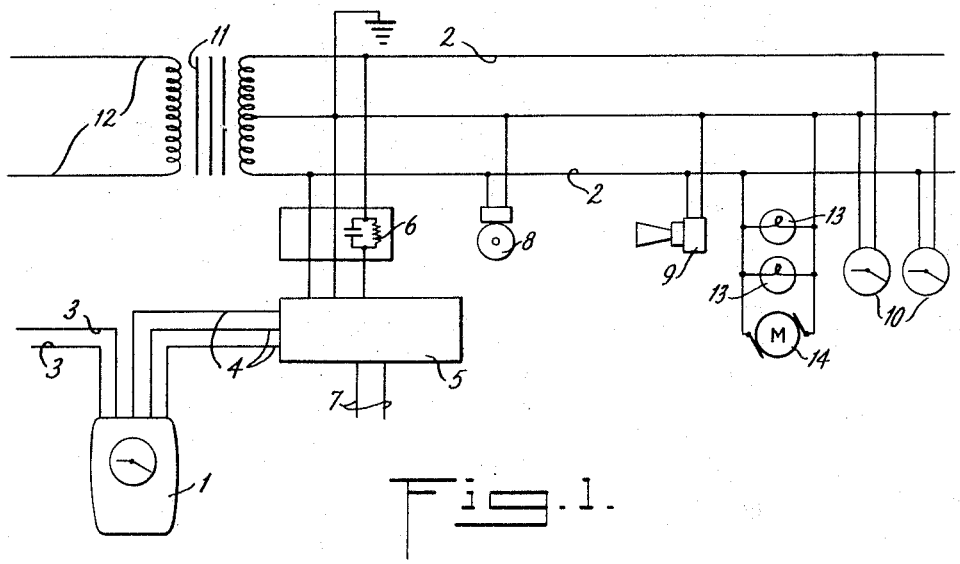
Figs. 1, 2, 3, 4 and 5 illustrate typical applications of the electronic self-regulation and signal system.

In Fig. 1 a step-down transformer 11 is interposed between a local supply power circuit 2 and a high distribution bus 12. The local supply circuit furnishes power to all sorts of common power utilization devices, such as lamps 13 and motor 14. A master clock 1, similar to the type disclosed in the application of R. B. Johnson et al., Serial No. 990, filed January 7, 1948, is connected to a source of energy 3, which source may be the local power circuit. Master clocks of this type are equipped with contacts that are cam operated to close at certain intervals. These contacts are utilized in this instance to energize through control lines 4 a transmitter 5 which is connected to a source of energy 7, and again the source may be the local power circuit. When energized, the transmitter sends a high frequency signal, through a line coupling section 6, to the local power circuit, which circuit then acts as the transmitting medium.

Signal units 8 and 9 and secondary clocks 10, each of which has an associated tuned receiver, are connected to the power sysem. On reception of the signal of their respective receivers, either the secondary clocks will be synchronized or the signal unit will be energized. The secondary clocks may be of the type disclosed in the application of C. E. Larrabee, Serial No. 5,447, filed January 30, 1948, now Patent No. 2,569,815, granted October 2, 1951, which clock has a mechanical means of time delay so that, as previously mentioned, transient currents will not cause any undesired operation. The receiver circuits of the signal units also provide a time delay, the composition and operation of which will be discussed later.

Figure 2:
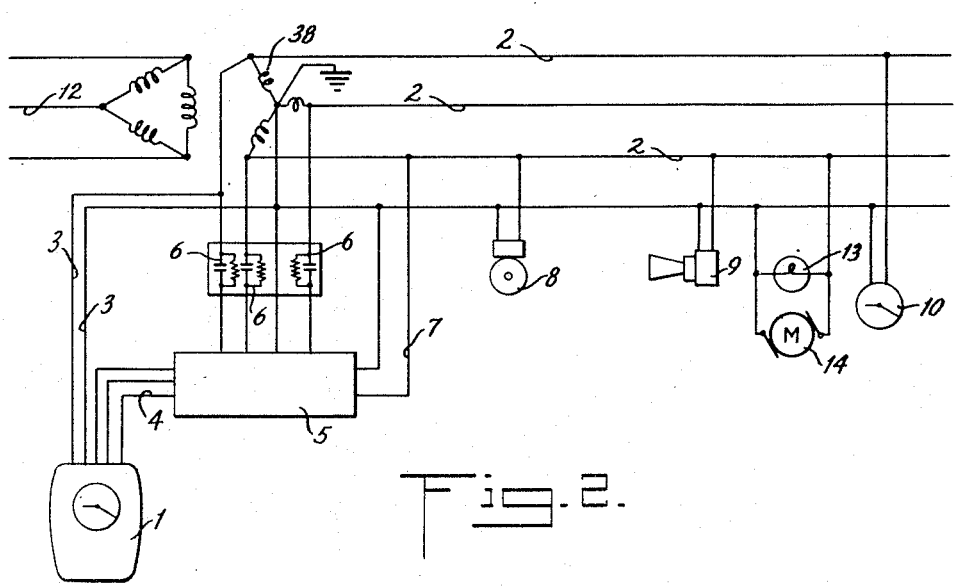
Figure 6:
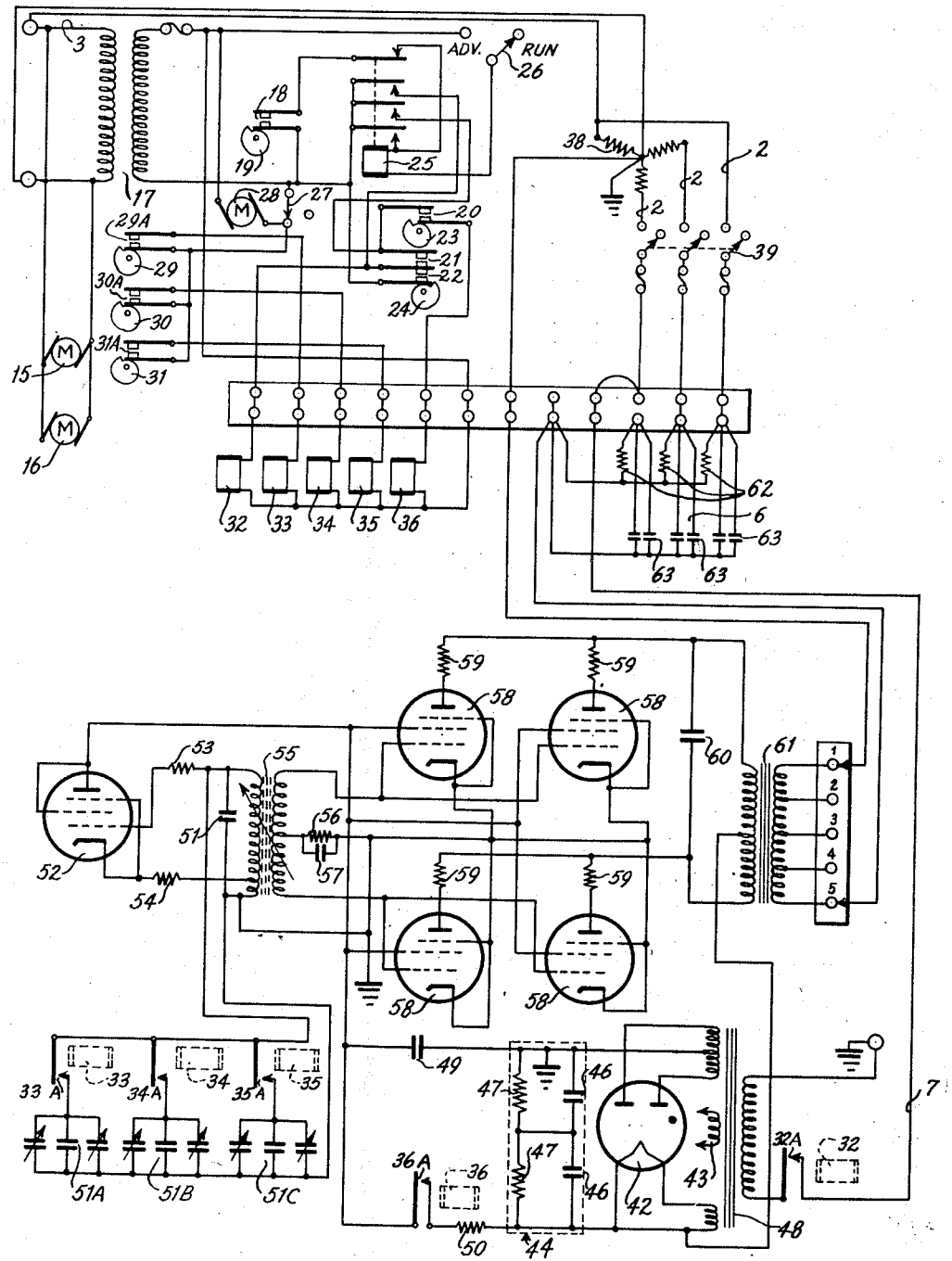
Fig. 6 is a wiring diagram of components contained in the master clock and transmitter.

In Figs. 2 and 6, a three-phase system, Y connected with a grounded neutral is illustrated. In both figures the master clock and the transmitter are shown obtaining energy through input lines 3 and 7 respectively, connected across legs of the Y, that is, across terminals of the Y and the grounded neutral.

The transmitter is of relatively simple construction (see Fig. 6), being composed of a rectifier, an oscillator and a push-pull amplifier. The power circuit is completed to the full wave rectifier 42 from the three-phase power system 38 through the contact 32A and the transformer 48 which includes a winding 43 for furnishing power to the tube filaments. A filter network 44 composed of capacitors 46 and resistors 47 smooth the pulsating D. C. current. The rectified voltage is applied, on closing of the keying relay contact 36A, to the plate of the oscillator tube 52, and to the screen grid of the amplifier tubes 58 through the dropping resistor 50. The plates of the amplifier tubes are connected to the rectified voltage through parasitic suppressor resistors 59 and the primary winding of the output transformer 61.

The preferred oscillator is a variation of the Hartley type using a pentode tube with the resonant circuit comprising the primary coil of a coupling transformer 55 and the tuning condenser 51. The frequency of the transmitter may be changed by the closing of any one of the relay contacts 33A, 34A or 35A which will cause the inclusion of capacitors 51A, 51B or 51C in the resonant circuit. The resistor 53, in the grid circuit, aids in the stabilization of the frequency by isolating the tube capacity from the circuit capacity, while resistor 54, in the cathode circuit, is used to create the proper bias.

The oscillator output is coupled through transformer 55 to an amplifier stage of four beam power tubes operating in push-pull parallel. Bias for the amplifier tubes is developed by resistor 56 and capacitor 57 while capacitor 49 is a screen by-pass. The transmitter output appears across the output transformer 61 which is tuned by the capacitor 60. The output is coupled through the line coupling section 6, consisting of coupling capacitors 63 and the safety bleeder resistors 62, and through the switch 39 to the local three phase power system 38.

Operation of the transmitter is controlled in the following manner. The master clock components including the control motor 15 and the winding motor 16, obtain power directly from the power lines. A transformer 17, also connected to the power lines, steps down the voltage to the proper value for the control circuits. Relay 32, which connects power to the transformer 48 in the transmitter, is energized through contacts 22, which are closed by cam 24 as it revolves at least two minutes before it is desired to transmit a signal so that the tubes will be energized and have a chance to warm up before the transmitter is keyed. Further revolution of the cam 24 will cause closing of contacts 21, the function of which is to select the minute within which it is desired to transmit the signal, so that on the next closing of contacts 20 by cam 23, the keying relay 36 is energized, and the transmitter is operated.

Contacts 20 are closed for the duration of four seconds each minute, which duration is the length of time that the signal is transmitted. The synchronization of the clocks thus usually takes place about once each hour and practical considerations make it desirable that the range of correction be limited to the values previously mentioned, approximately fifty-nine minutes slow to fifty-five seconds fast.

If the system is at all normal, that range of synchronization is more than sufficient for satisfactory operation, but there may be occasions when through a failure of one sort or another the secondary clocks may be off by as much as eleven hours. In that case, synchronization can be accomplished by turning the advance-run switch 26 to the advance position. If conditions are proper for transmitting, the relay 25 is operated which, in effect, shunts contacts 21 and 22. While those contacts are shunted, the transmitter will transmit the synchronizing signal once each minute as the contact 20 is closed. The secondary clocks will then be moved ahead one hour per minute until the switch 26 is opened. If the secondary clocks are eleven hours slow the switch 26 should be left in the advance position until the synchronizing pulse has been transmitted ten times. As the hands begin to reset the tenth time the switch should be thrown to the run position, so that during the next 58th to the 59th minutes, the regular correcting cycle, all clocks will correct to the proper time. Cam operated contact 18 can be used to prevent energizing of the relay 25, when the switch is thrown to the advance position, should circuit conditions be such that the transmitter should not be keyed. For example, it is necessary that the transmitter tubes be at the proper operating temperature at the time of transmission. To insure that the tubes have time to reach the proper temperature, cam 19 is programmed to close contact 18, for an instant, just subsequent to the time that contact 20 opens. Therefore, when the advance-run switch is thrown to the advance position, relay 25 will not be closed until the closing of contact 18. However, at that time, the relay 25 closes and remains closed, thus energizing the power relay 32, and thereby furnishing power to the tubes. The keying relay will not be energized until the next closing of contact 20, approximately fifty-six seconds later, which gives the tubes ample time to reach the operating temperature.

Provision is made in the circuit of Fig. 6 for three additional frequencies of transmission which frequencies are used in the operation of audible signal units. A programming motor 28, energized through switch 27 is synchronized with the clock movement and is used to drive several cams. Two of these cams (not shown) have a function similar to cams 23 and 24, that is to energize the transmitter, to select the minute of transmission, and to control the duration of the signal. Cams 29, 30 and 31 are utilized to change the frequency of transmission through contacts 29A, 30A and 31A; relays 33, 34, and 35; and capacitors 51A, 51B and 51C. All three of the circuits are identical so that the explanation of one will suffice. Cam 31 closes contact 31A, some time before keying of the transmitter, which energizes relay 35 placing capacitor 51C in parallel with capacitor 51 to increase the capacitance of the tuned circuit and thus change the frequency of transmission. Of course not more than one frequency can be transmitted at one time but the program can be set to cause transmission of one after another with little or no lapse between the signals.

Figure 7:
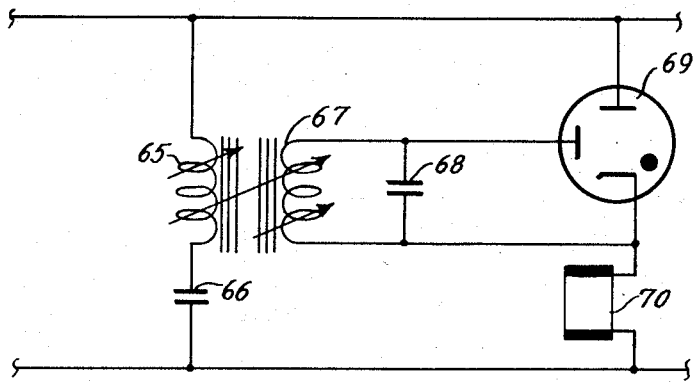
Figs. 7 and 8 are diagrams of the receiver circuits used in the secondary clocks and signal units, respectively.
Figure 8:
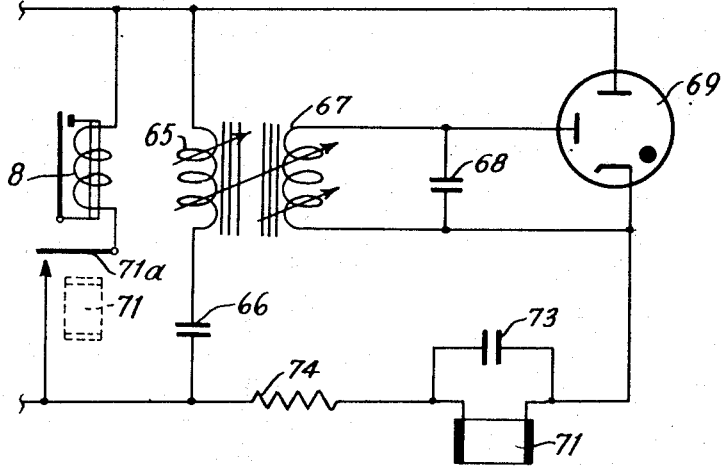

The receiver units (see Figs. 7 and 8) utilize both series and parallel resonant circuits. The series circuit which offers a high impedance to sixty cycle current, the usual power line frequency, is composed of the coil 65 and the capacitor 66. A coil 67, which is inductively coupled with the coil 65, is paralleled with capacitor 68 to form a parallel resonant circuit at the signal frequency. The voltage developed across that latter circuit causes the cold cathode tube 69 to fire across the starting anode and cathode, which ionizes the gas in the tube and permits a discharge of the power frequency from cathode to anode. The discharge is extinguished on the first negative cycle of the power frequency following the end of the signal transmission. In the receiver of the secondary clock (see Fig. 7), on the discharge from the cathode to anode of the tube, a clutch magnet 70 is energized to start the self-regulating cycle of the clock. In the receiver of the audible signal unit (see Fig. 8), relay 71 is energized, closing its contact 71A, and thereby causing operation of the audible signal unit 8. The capacitor 73, connected in parallel with the relay coil 71, and the resistor 74, are selected to provide a time delay in the operation of the relay. The time of delay is the time necessary after firing of tube, for the capacitor 73 to change through resistor 74 to a voltage sufficient to cause operation of the relay 71. The values of the components are selected so that the time is of the order of two seconds.

Figure 3:
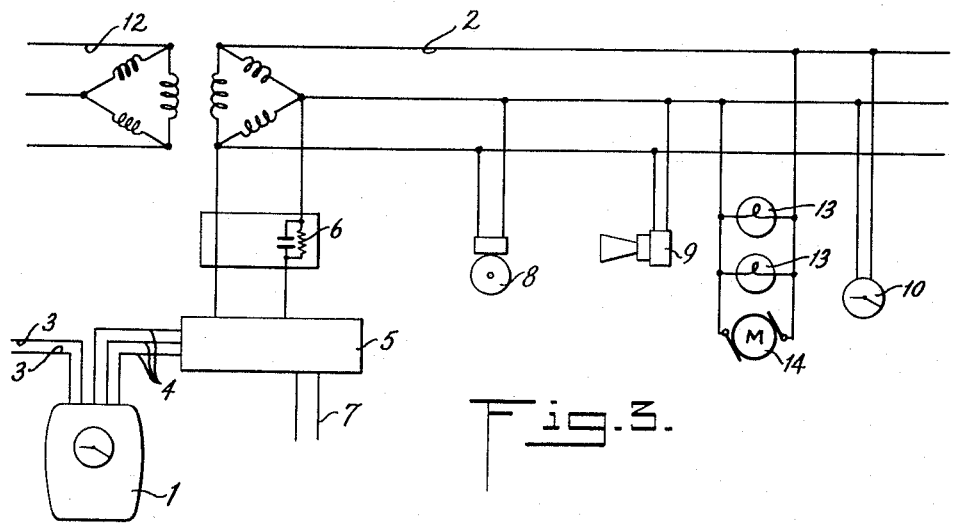

Fig. 3 is a diagram of a three-phase three-wire ungrounded delta system with the signal fed across phases. In this system, the signal voltage on the phase fed will be greater than that of the other two phases. However, the circuit will provide satisfactory operation across any phase since the amplification obtained in the receiver circuit is sufficient to fire the tube. It is not feasible to use this method if the power circuit makes use of power factor correction capacitors, since the capacitors connected between the phases would be a large load or the practical short for the signal frequency.

Figure 4:
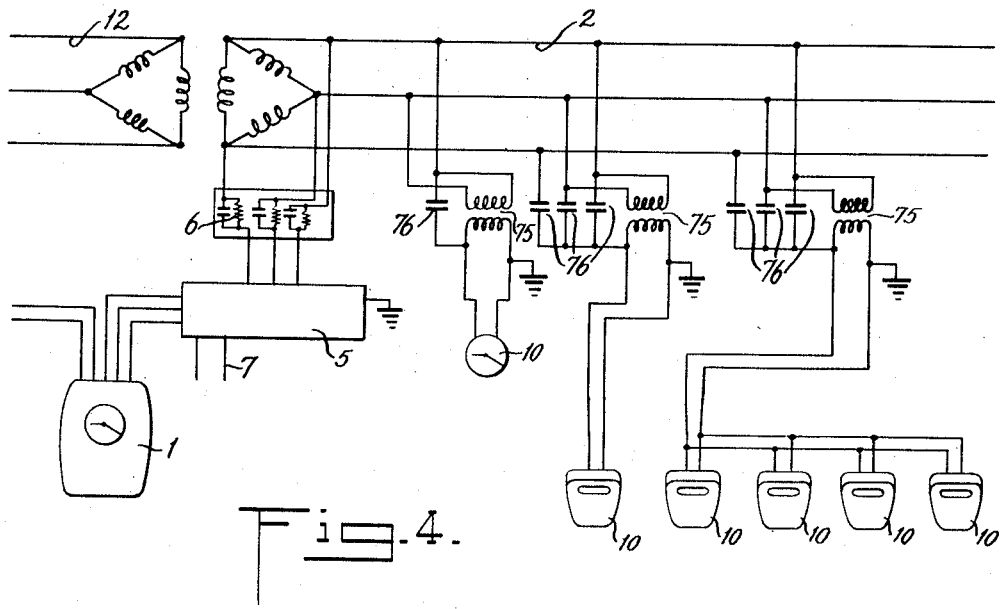

Fig. 4 is a diagram of a three-phase three-wire ungrounded delta system with the signal fed between phases and ground. The signal is fed from the transmitter 5 through the line coupling section 6 to the terminals of the delta connected secondary windings. Since the signal frequency on each phase is equal, no signal will be produced in the transformer. On the other hand, the signal will appear between each phase and ground. In order to both operate and synchronize the secondary clocks in this system, small transformers 75 are used. The primary winding is connected across one of the power phases while the secondary is connected to the clock to be operated thereby completing the power circuit. Capacitors 76 are interposed between one or more of the power lines 2 and one side of the secondary of the small transformer, the other side of the secondary being grounded. The signal is thus transmitted over the power lines 2, through condensers 76, and through the secondary circuit of the transformers 75, including the clock or clocks to be synchronized, to ground.

Figure 5:
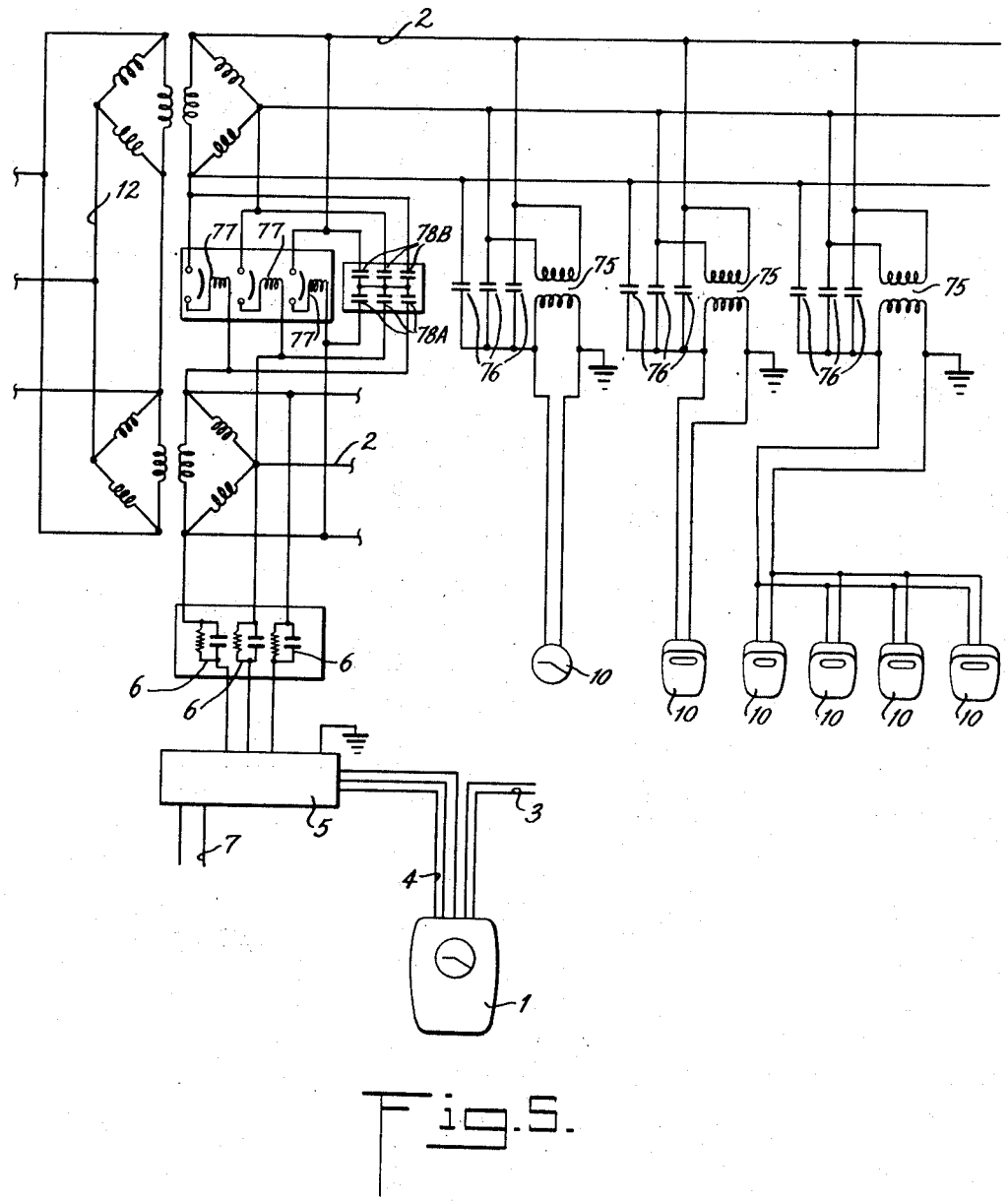

A diagram of a three-phase, three-wire ungrounded delta connected system, having the signal fed between phases and ground, and having two or more transformer secondaries operated both separately and in parallel is illustrated in Fig. 5.

The operation of a two-transformer power system requires the use of disconnect breakers 77 between the secondaries of each in order that separate operation will be possible and also to act as a protective device when operating in parallel. When operating separately, it is necessary to furnish some means to pass or couple the signal frequency from one circuit to another and yet not permit passage of the power frequency. This can be accomplished by the use of capacitors, selecting values that will provide a high impedance at the low power frequency and a low impedance at the high signal frequency. Of course, one power circuit can be directly connected to the transmitter in the manner explained above and illustrated in Fig. 4 but any additional power circuits not operating in parallel will have to be coupled. The network of capacitors used in this instance is composed of three capacitors 78A having one side connected to each terminal of the delta system nearest the transmitter, and three additional capacitors 78B having one side connected to each terminal of the delta system to be coupled, while all six capacitors have their remaining sides in a common connection. Such a coupling network provides many advantages. In the event that one of the capacitors, either 78A or 78B, develops a short, coupling of the signal frequency still takes place, the remaining capacitors having a low impedance at the signal frequency, yet the power frequency is blocked since there would still be at least one capacitor, offering high impedance to the power frequency, between the lines of the two systems.

If one of the capacitors 78A is open circuited, coupling of the signal frequency is made through the remaining capacitors 78A to the common connection and thence through the three capacitors 78B to each line of the second system. Thus, the full signal frequency can be obtained from each line of each system. However, if one of the capacitors 78B opens, while coupling takes place through the remaining capacitors, the full signal will not be present in the line directly connected to the open capacitor. The coupled circuit will be similar in operation to the circuit shown in Fig. 3, and while the signal on the one line may be reduced, the amplification will usually be sufficient to synchronize the clocks or cause operation of the signal units of the components connected to that line. The power frequency, of course, is blocked with greater effectivenesss by opening of any one of the capacitors.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In combination with a delta connected alternating current power supply line having load devices connected across phases thereof, a generator for producing signal impulses of frequency higher than that of the alternating current on said supply line, a ground connection, means for coupling said generator between said ground connection and each of the wires of said supply line, said last means including means to interpose a high impedance to said alternating current between said supply line wires and said ground connection, time controlled means for causing said generator to impress said signal impulses on all of the wires of said supply line through said coupling means in the same time phase, a synchronous-motor-operated time keeping device connected across a phase of said supply line, a receiver including circuit means selectively responsive to said impulses for controlling said time keeping device, means connecting said circuit means to ground, and capacitative coupling means for transmitting said signal impulses from all of the said supply line wires to said circuit means.

2. In combination with a delta connected alternating current power supply line having load devices connected across phases thereof, a generator for producing signal impulses of frequency different from that of the alternating current on said supply line, a ground connection, means for coupling said generator between said ground connection and one or more wires of said supply line, said last means including means to interpose a high impedance to said alternating current between said supply line wires and said ground connection, time controlled means for causing said generator to impress said signal impulses on one or more wires of said supply line through said coupling means, a synchronous-motor-operated time keeping device, means including a transformer for coupling said motor to one phase of said supply line, a receiver including circuit means selectively responsive to said impulses connected across the secondary of said transformer, for controlling said time keeping device, said receiver including circuit means selectively responsive to said impulses, capacitative means for coupling all of the wires of said supply line to one side of the secondary of said transformer, and means connecting the other side of said secondary to ground.

JOHN L. WAGNER.
WASHINGTON WEBB.
ROBERT N. EICHORN.

References Cited in the file of this patent
UNITED STATES PATENTS

| Number | Name | Date |
| --- | --- | --- |
| 2,248,164 | Dicke | July 8, 1941 |